Feb. 22, 1949.　　　H. W. LEVERENZ　　　2,462,517
METHOD OF MANUFACTURE OF LUMINESCENT MATERIALS
Filed Sept. 29, 1942
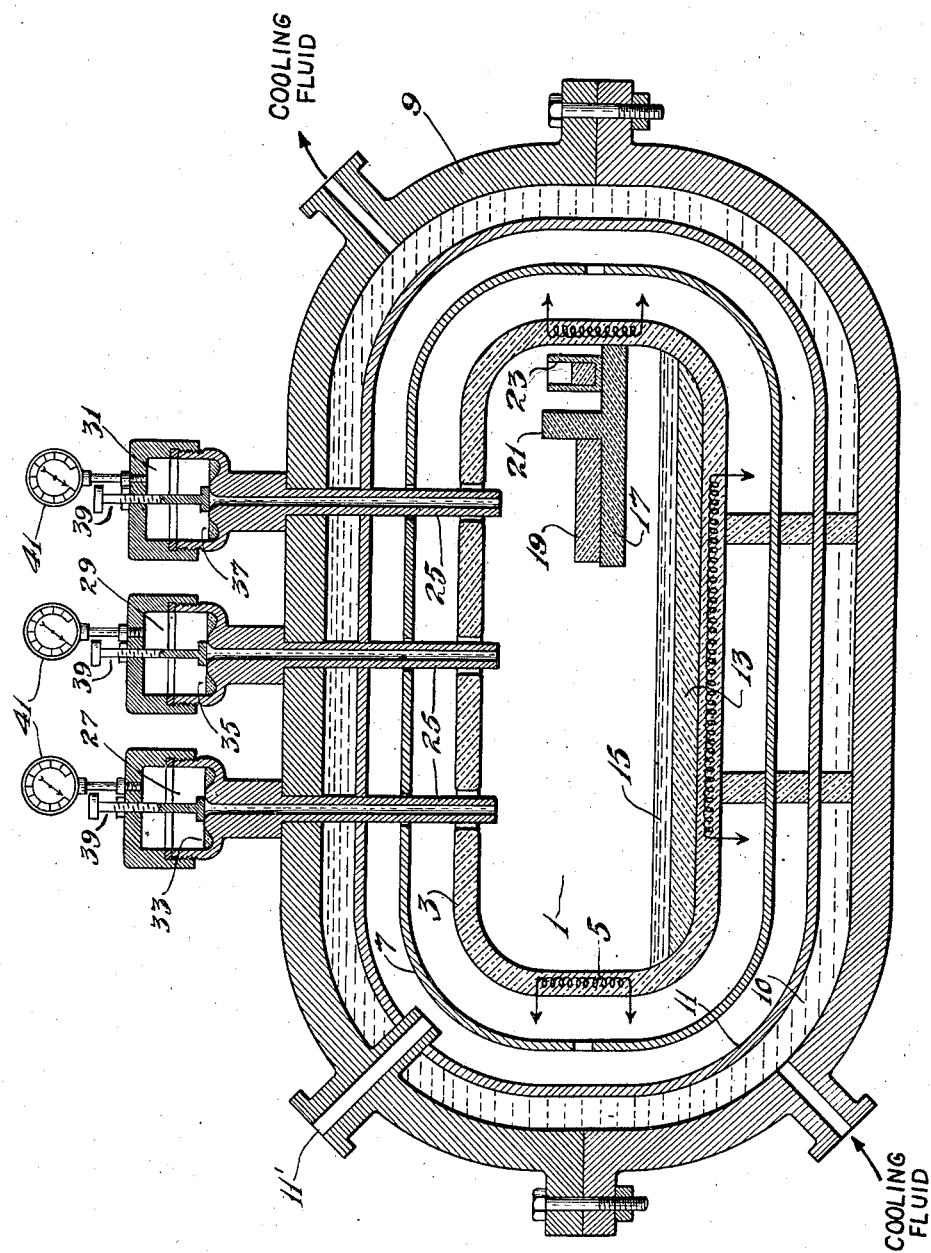
INVENTOR
Humboldt W. Leverenz
BY Charles McClair
ATTORNEY Patented Feb. 22, 1949

2,462,517

UNITED STATES PATENT OFFICE 2,462,517

METHOD OF MANUFACTURE OF LUMINESCENT MATERIALS

Humboldt W. Leverenz, South Orange, N. J., assignor to Radio Corporation of America, a corporation of Delaware Application September 29, 1942, Serial No. 460,054

3 Claims. (Cl. 252—301.6)

My invention relates to inorganic luminescent materials or phosphors and to their synthetic manufacture.

Various phosphors such as willemite are known and occur as natural crystals incorporating a luminescent activator such as manganese. These natural phosphor materials are relatively impure and have been improved by thermo-synthesis from their constituents by co-crystallizing their constituents at a relatively high temperature at or near atmospheric pressure. By known methods it is very difficult to manufacture phosphors consisting of large crystals, and in addition, the constituents which it is possible to combine are dependent upon the natural crystallization characteristics of the phosphors. Thus it is difficult if not impossible to incorporate activators or other constituents which are volatile at or above the crystallizing temperature of the phosphors. Known phosphors are homogeneous with respect to the average distribution of their constituents, and since the combining ratios of various constituents are usually within a narrow range, it is difficult to vary the phosphor characteristics over a wide range merely by varying the temperature at which the phosphor is thermo-synthesized. In addition and for similar reasons, the spectral absorption and emission characteristics of inorganic phosphors, which depend upon the inherent crystallization characteristics and on the normally-assumed ratios of the constituents, are rather limited. Furthermore, the luminescent efficiency of inorganic phosphors is dependent upon the temperature of crystallization, the efficiency decreasing with higher temperatures above the optimum crystallization temperature. Large particle size and greater stability may be obtained at higher crystallization temperatures but only at a loss in efficiency. Therefore a compromise must be made in obtaining the desired characteristics.

It is an object of my invention to provide large phosphor crystals and a method of manufacture whereby crystals may be grown or formed in various shapes. It is a further object to provide means for controllably altering the phosphor constituent ratios whereby improved phosphors may be obtained. It is a further object to provide means for manufacturing non-homogeneous phosphors and phosphors having stratified characteristics both as to color of luminescence and efficiency. It is a further object to provide means to alter and control the excitation and emission spectra during thermo-synthesis, and it is a still further object to provide phosphors incorporating volatile activators and other constituents, as well as providing crystallizing aids such as various fluxes which may be varied over a wide range, and a method of manufacturing such phosphors.

In accordance with my invention, I control the partial pressures of each phosphor constituent including one or more crystallization aids, such as various fluxes, by selective introduction of vapors of the constituents and fluxes at high partial pressure in the presence of and during high temperature synthesis of the phosphor. More particularly, I manufacture phosphor materials incorporating luminescence activators under controlled conditions of high pressure and relatively high temperature in a controlled atmosphere including vapors of the various constituents, and I vary the vapor pressure of the constituents and crystallizing aids to provide crystallization wherein the constituents being combined and co-crystallized may be varied over wide limits. These and other objects, features and advantages of my invention will become apparent when considered in view of the following description and the accompanying drawing which shows one type of apparatus suitable for practicing my invention.

The range of temperature under which phosphors may be crystallized at atmospheric pressure without destroying their luminescent properties is relatively narrow, varying up to 1800° C. for such materials as oxygen-containing phosphors such as the aluminates; to 1600° C. for such phosphors as the various silicates, and to 1400° C. for the sulphides. These temperatures are usually adequate to provide atomic, ionic or molecular mobility sufficient to obtain conventional crystallization characteristics, although the ratio of desired constituents prior to crystallization may not equal the ratio of constituents following crystallization. Thus one constituent may be more volatile at the crystallizing temperature than another constituent, resulting in a deficiency of the constituent which is most volatile. The deficiency may be even greater with prolonged firing or higher temperature synthesis, and since the phosphor characteristics may vary greatly with small variation in constituent ratios, it is very difficult to determine the exact ratio prior to crystallization which will produce a phosphor of the desired characteristics. I have found that improved characteristics over wider range of constituent content may be obtained by increasing the pressure of thermo-crystallization in an atmosphere deficient in or containing an excess of one or more of the phosphor constituents in vapor form. Therefore in accordance with my invention, I thermo-synthesize my improved phosphors under pressures exceeding atmospheric pressure, preferably of the order of 100 atmospheres or greater.

Referring to the drawing, I have shown a furnace particularly adapted for high pressure thermo-synthesis comprising a chamber 1 having walls 3 of material inert with respect to the phosphor materials or their constituents entering into the synthesis thereof. Materials such as platinum, aluminum oxide or other highly refractory material may be used to form the walls 3 of the chamber 1 which may be heated either inductively or by resistance heaters 5 contained within the walls. The walls 3 may be surrounded by one or more heat baffles 7 enclosed within the pressure chamber or housing 9. The heat baffle, such as the baffle 7, may be apertured or loosely fitted around the walls of the chamber 1 to allow equalization of the pressure within the housing 9. Since the chamber 1 must be operated at high temperatures, I prefer to cool the housing 9 such as by circulating a fluid 10 in contact with the inner surface thereof, restrained from filling the chamber 1 by a wall 11. This wall may be relatively thin as it need not withstand the operating pressure, the fluid 10, such as water, being introduced through the housing 9. Through the housing 9, I provide an inlet 11' to admit any desired atmosphere at higher than atmospheric pressure within the housing so that either a neutral, oxidizing or reducing atmosphere may be provided at elevated pressure within the chamber 1.

I will refer particularly to the synthesis of a luminescent activated metal sulphide type of phosphor, although other inorganic phosphors, such as silicates, germanates, borates, tungstates and others, may be thermo-synthesized in a similar manner depending only upon the constituents and crystallizing properties of such constituents. In accordance with my invention, I introduce into the pressure chamber 1 a quantity of phosphor constituents, such as a mass of zinc or sulphur in the case of the manufacture of a zinc sulphide, or I introduce chemically precipitated zinc sulphide as shown at 13. I then heat the chamber 1 such as by energizing the resistance heaters 5 to convert either all or a portion of the zinc sulphide 13 into liquid zinc sulphide 15 to develop a vapor pressure of said zinc sulphide. The temperature required to liquify the zinc sulphide or any other phosphor constituent used is a function of the pressure maintained within the chamber 1. For example, I may choose a pressure of 150 atmospheres at which pure zinc sulphide becomes liquified at a temperature of 1850° C. In accordance with my invention, I provide condensation means within the chamber 1 in or on which the desired phosphor may crystallize from the vapor phase. I have shown in the drawing a platform 17 within the chamber 1 on which the phosphor constituents may crystallize from the vapor phase to form a crystal layer 19, although I prefer to crystallize the phosphor under the protection of a baffle 21, such as in a crystallizing form 23. The platform 17 or form 23 may be fluid cooled to provide condensation of the phosphor from the vapor phase, such as by water conduits in the platform 17 or form 23. However, in accordance with my invention, I maintain the partial vapor pressures of various constituents at pressures differing from the normal vapor pressure at the operating temperature of the chamber 1 to modify the crystallized characteristics of the phosphor constituents.

Referring to the drawing, I have shown means to introduce into the chamber 1 various phosphor constituent materials and crystallizing aids or fluxes through the high pressure housing 9 under pressures corresponding to the desired partial pressures at which the desired crystallization occurs. For example, inlets may be provided extending through the housing 9 into the chamber 1, these inlets exterior to the housing being designed to withstand the high pressure maintained therein. Referring to the drawing, I have shown a plurality of conduits 25 extending within the chamber 1 from the housing 9, each surmounted by a constituent or flux supply chamber designated 27, 29 and 31. The conduits may extend loosely through the wall 3 as shown to permit pressure to be applied to chamber 1. Each of the chambers 27—31 is designed to retain one of the phospher constituents or fluxes shown at 33, 35 and 37 and each may be heated either by the direct application of heat or by inductive heating to vaporize the constituents individually as required. Furthermore, each of the conduits 25 may be provided with a valve 39 to control the admission of the constituents in the vapor phase to the chamber 1. I have shown only three constituent and flux supply chambers with their corresponding conduits, it being appreciated that any number of such chambers or constituents may be used depending upon the number of the phosphor constituents to be varied. For example, the principal phosphor constituents as indicated above may be zinc and sulphur preferably as a sulphide, at least a portion of which is maintained in the liquid phase as shown at 15. For this type of phosphor let it be assumed that the activator content is to be varied over wide limits during the crystallization of the phosphor as shown at 19 or 23. For this type of manufacture the constituent supply chamber 27 may contain a copper compound 33, the copper of which serves as an activator for the phosphor 19 or 23 during crystallization thereof, and the supply chamber 29 may contain a flux 35 such as potassium or sodium chloride to aid the crystallizing process. The admission of the copper compound in the vapor phase may be controlled and the amount calculated by reference to a pressure gauge 41 attached to the chamber 27, noting the pressure with respect to the condition of the valve opening of the valve 39.

Either the zinc or the sulphur content of the crystallized phosphor 19 and 23 may be increased by providing a vapor source of one or both of these constituents. For example, the constituent supply chamber 31 may contain a quantity of zinc chloride 37 where it is desired to increase the zinc content, or hydrogen sulphide where it is desired to increase the sulphur content of the crystallized phosphor. My method of varying the constituent content is particularly applicable where the desired phosphor includes two or more metals such as zinc and cadmium as a sulphide or zinc and beryllium as a silicate. Thus a plurality of constituent chambers, as described above, may be utilized either for the metal, non-metal or activator constituents as well as for one or more crystallization aids or fluxes.

Several modes of operation may be followed utilizing the equipment shown in the drawing. For example, the first pure crystals of pure zinc sulphide may be allowed to form either in the presence of or without a flux, whereupon the activator, flux or crystal modifying ingredient, volatilized from one or more of the chambers 27—29, may be admitted to the chamber 1 to build upon the relatively non-luminescent non-colored core of each crystal a highly luminescent shell. Similarly, the phosphor crystal core may be allowed to form in the presence of a low partial pressure of a copper compound such as cupric chloride to form a core having predetermined luminescent color characteristics, whereupon a shell having different luminescent color characteristics may then be crystallized by changing the activator such as to silver derived from vaporized silver chloride. Thus by my method I am able to provide a new phosphor material comprising non-luminescent transparent single crystals or crystal rods surrounded by co-crystallized shells of luminescent crystal layers.

The reverse effect of growing the crystal or crystals of luminescent material and then removing the activating ingredients from the vapor phase and thereby decreasing the concentration of the corresponding ingredients in the phosphors and surrounding the luminescent core with a relatively non-luminescent or different luminescent shell is likewise feasible in accordance with my invention. For example, the phosphor material may be crystallized as shown at 19 or 23 in the presence of the vaporized activator compound, whereupon the vapor pressure of the activator compound may be decreased to provide the relatively non-luminescent shell on the highly luminescent core. Consequently, by varying the partial pressure of any constituent of the phosphor in the vapor phase, the relative concentration of that constituent or its corresponding reaction product in the liquid or solid phase may be varied either suddenly or gradually during the growth of the crystals from the constituents in the vapor phase. Thus while I have emphasized varying the activator constituents, it will be appreciated that the principal phosphor constituents may be likewise varied. For example, the vapor pressure of zinc or sulphur may be increased for decreased during the crystallization process by vaporizing zinc chloride or hydrogen sulphide to obtain a controlled vapor pressure of either of the constituent ions of $Zn^{++}$ or $S^=$ (in compounds). Similarly, while I have described the synthesis of a phosphor of the sulphide type, other phosphors may be synthesized in a similar manner. For example, cadmium may be substituted in whole in part for the zinc in the above example and selenium may be substituted either in whole or in part for the sulphur in this example. Furthermore, oxygen-containing, inorganic, crystallized phosphors such as the silicates and germanates may be synthesized in a similar manner by varying the vapor pressure of the metal constituents, oxygen and such constituents as zinc oxide, beryllium oxide, silica and germania. Furthermore, constituents and activators which are volatile at the necessary high temperatures and normal atmospheric pressures may be utilized. Thus rhenium and masurium as activators may be incorporated in silicate and other oxygen-containing phosphors during crystallization. Thus while I have specifically referred to the synthesis of a zinc sulphide phosphor, it will be appreciated that my invention is not so limited but that other phosphors of the types indicated may be synthesized without departing from the scope of my invention as set forth in the appended claims.

I claim:

1. The method of making a phosphor which consists in vaporizing a compound consisting of sulphur and a member from the group consisting of zinc and cadmium and mixtures thereof under pressure higher than atmospheric, separately vaporizing an activator selected from the group consisting of copper and silver, mixing said vapors and co-crystallizing said compound and the activator therefrom.

2. The method of making a phosphor which consists in vaporizing a compound consisting of a member selected from the group consisting of sulphur and selenium and mixtures thereof and a member from the group consisting of zinc and cadmium and mixtures thereof under pressure higher than atmospheric, separately vaporizing an activator selected from the group consisting of copper and silver, mixing said vapors and co-crystallizing said compound and the activator therefor.

3. The method of making a phosphor which consists in vaporizing a compound consisting of selenium and a member from the group consisting of zinc and cadmium and mixtures thereof under pressure higher than atmospheric, separately vaporizing an activator selected from the group consisting of copper and silver, mixing said vapors and co-crystallizing said compound and the activator thereof.

HUMBOLDT W. LEVERENZ.

REFERENCES CITED

The following references are of record in the file of this patent:

UNITED STATES PATENTS

| Number | Name | Date |
| --- | --- | --- |
| 1,954,691 | De Boer | Apr. 10, 1934 |
| 2,071,521 | Hartmann | Feb. 23, 1937 |
| 2,123,939 | Germer | July 19, 1938 |
| 2,303,963 | Uhle | Dec. 1, 1942 |
| 2,353,612 | Gardner | July 11, 1944 |

FOREIGN PATENTS

| Number | Country | Date |
| --- | --- | --- |
| 407,540 | Great Britain | Mar. 22, 1934 |
| 502,142 | Great Britain | Sept. 30, 1939 |
| 97,931 | Sweden | Mar. 30, 1939 |